Dec. 20, 1949     C. G. MEYERS ET AL     2,491,826
COMBINED MEASURING AND FILLING MACHINE
Filed July 15, 1948     5 Sheets-Sheet 4

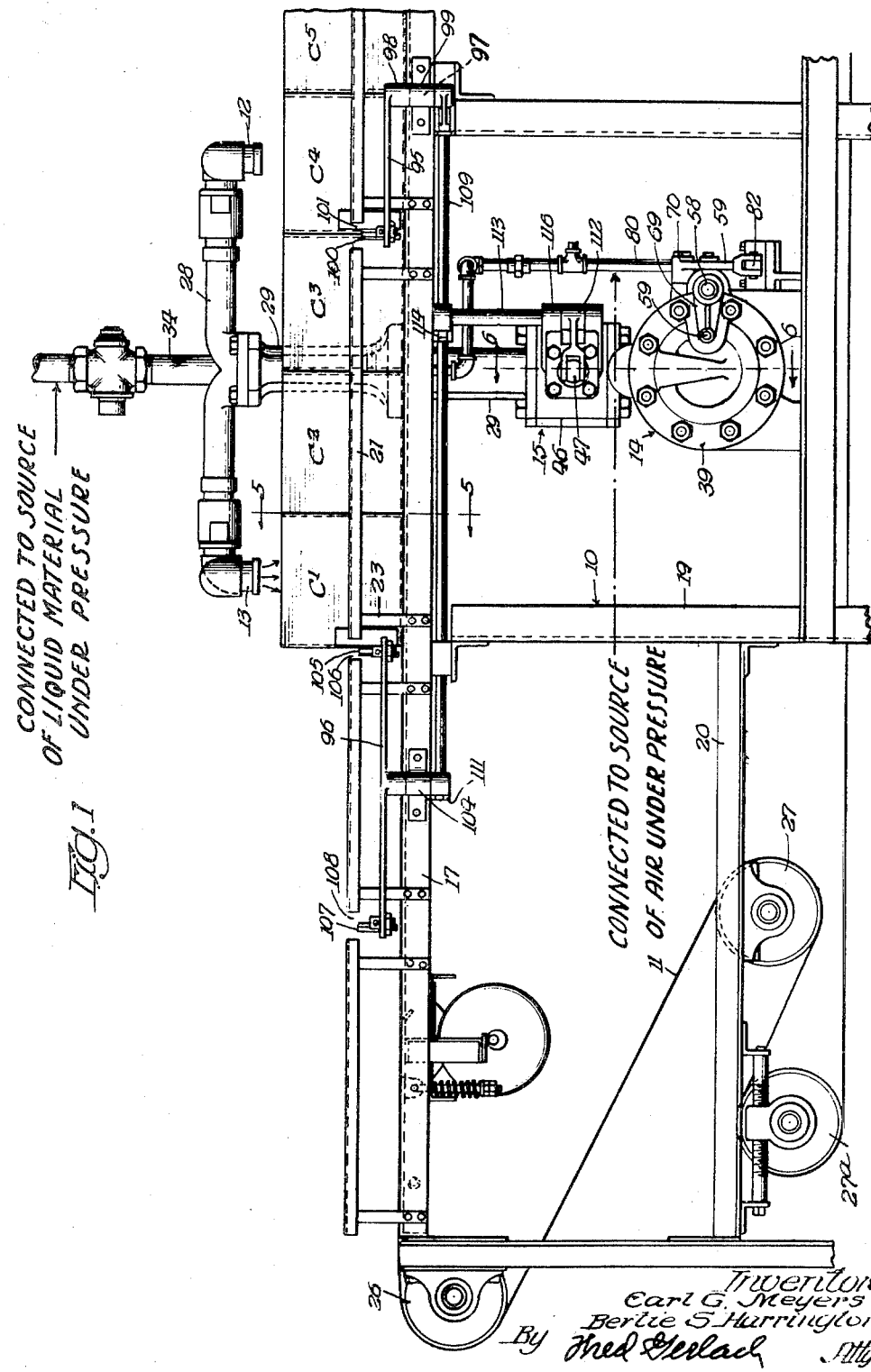

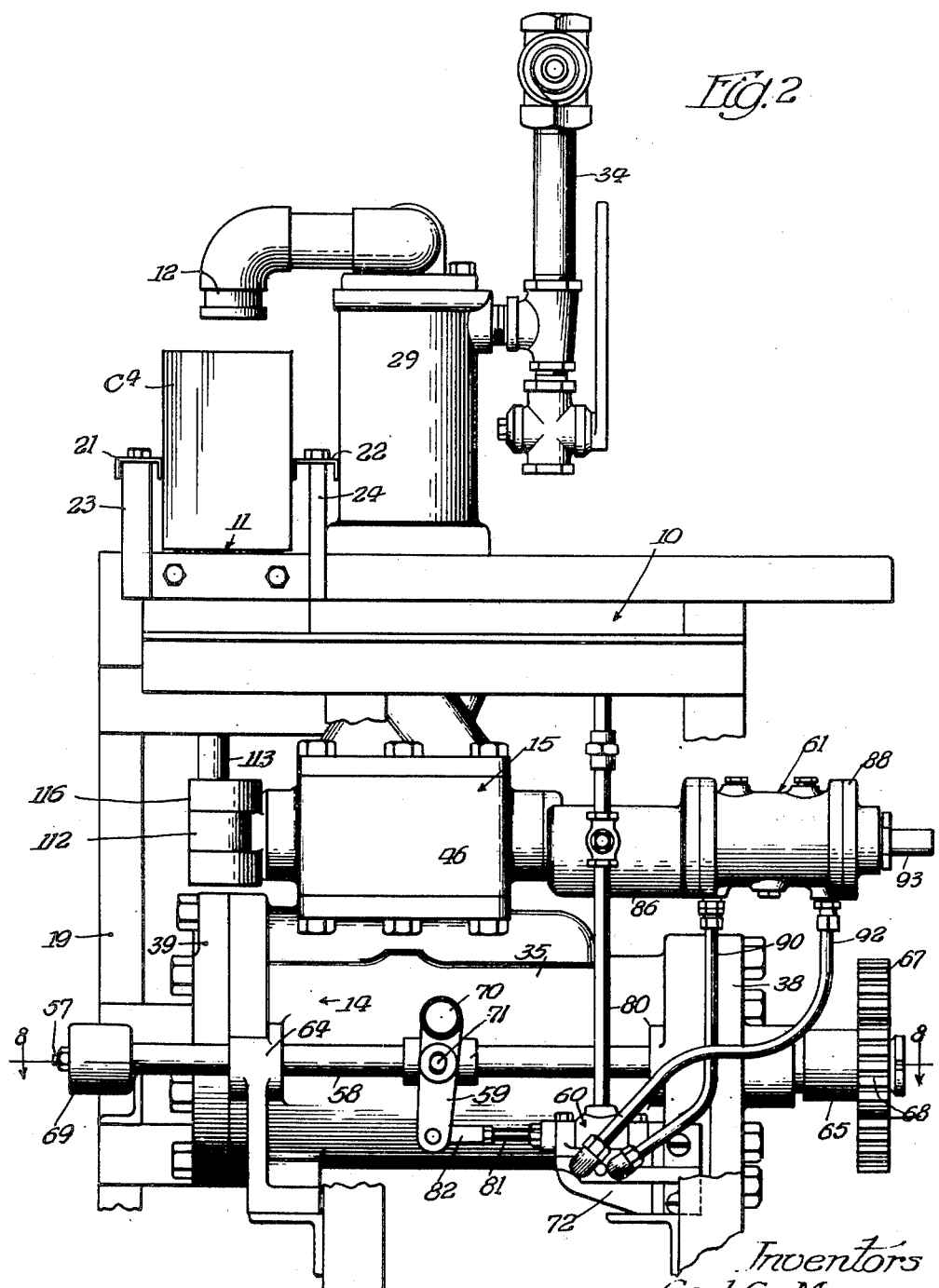

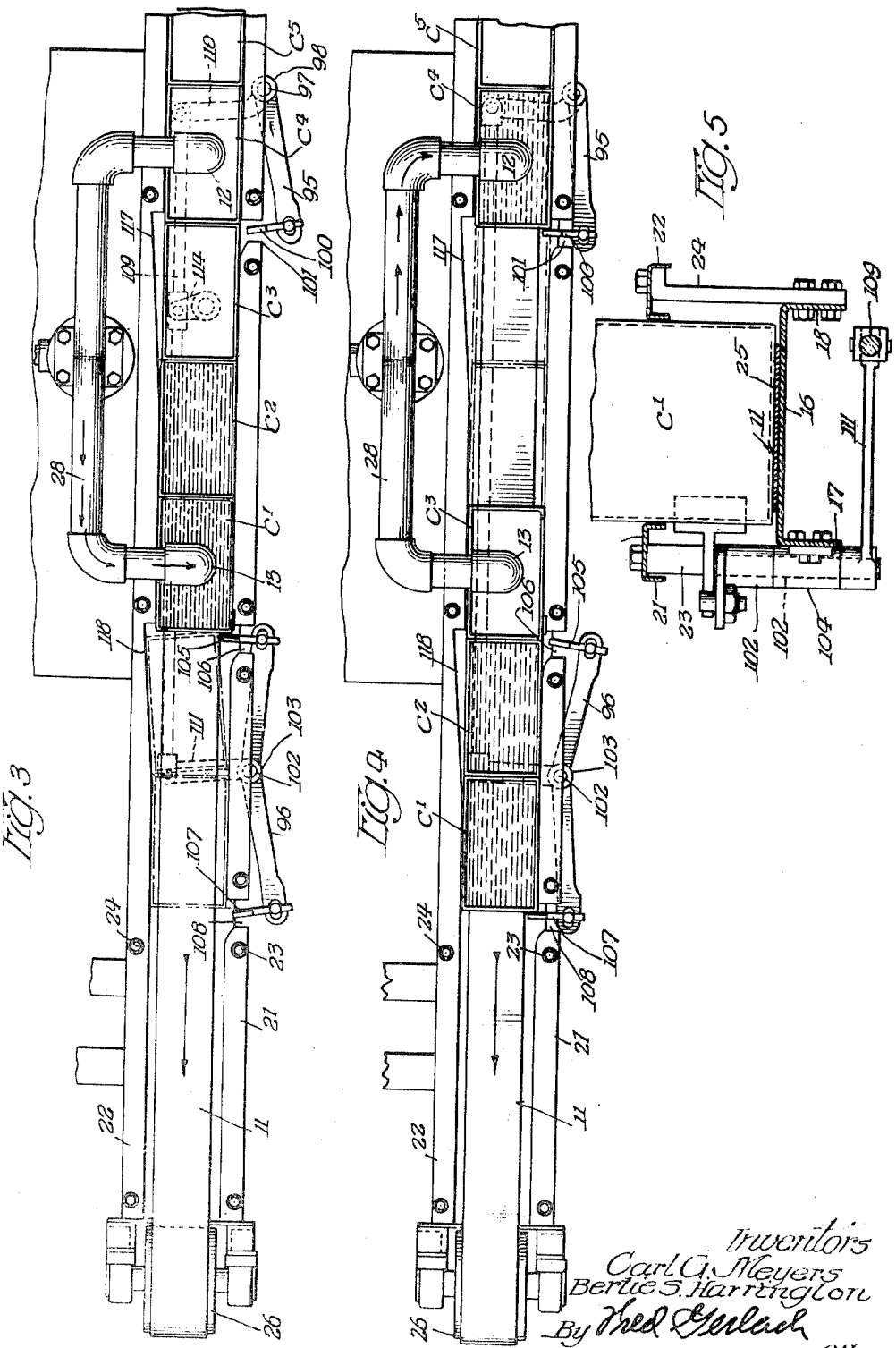

Inventors
Carl G. Meyers
Bertie S. Harrington
By Fred Gerlach
Atty

Dec. 20, 1949     C. G. MEYERS ET AL     2,491,826
COMBINED MEASURING AND FILLING MACHINE

Filed July 15, 1948     5 Sheets-Sheet 5

Inventors
Curl G. Meyers
Bertie S. Harrington
By Fred Gerlach
Atty

Patented Dec. 20, 1949

2,491,826

UNITED STATES PATENT OFFICE 2,491,826

COMBINED MEASURING AND FILLING MACHINE

Carl G. Meyers and Bertie S. Harrington, Chicago, Ill., assignors to Armour and Company, Chicago, Ill., a corporation of Illinois Application July 15, 1948, Serial No. 38,884

7 Claims. (Cl. 226—95)

The present invention relates generally to combined measuring and filling machines. More particularly the invention relates to that type of machine which serves, during operation thereof, to fill containers with measured charges or quantities of liquid material, such, for example, as congealable lard or vegetable oil shortening, and comprises as its main parts: (1) a frame type supporting structure having an elongated horizontal platform at the top thereof; (2) an endless power driven conveyor having one of its reaches resting on, and extending lengthwise of, the platform, and adapted to feed the containers; (3) a pair of laterally spaced depending nozzles over the platform supported reach on the conveyor; and (4) a device controlled by a two-position valve mechanism and in the form of a cylinder and floating piston for alternately delivering to the nozzles measured charges of the liquid material.

One object of the invention is to provide a combined measuring and filling machine of this type which is an improvement upon, and has certain advantages over, that which is disclosed in, and forms the subject matter of, United States Patent No. 1,700,494, dated January 29, 1929, and is essentially simpler so far as design is concerned, and more efficient and positive in operation.

Another object of the invention is to provide a machine of the aforementioned type in which the discharge nozzles are stationary and the endless conveyor is in the form of a belt, is driven continuously and constantly for container feeding purposes, and has associated with the platform supported reach thereof automatic means for arresting or stopping the containers in such manner that there is an empty stationary container under each nozzle in connection with discharge of a measured charge of liquid material therefrom.

A further object of the invention is to provide a combined measuring and filling machine of the last mentioned character in which the means for arresting or stopping the containers so that there is an empty stationary container under each nozzle during discharge of material therefrom is automatically actuated and controlled by the two-position valve mechanism for the cylinder-floating piston device.

A still further object of the invention is to provide a combined measuring and filling machine which is generally of new and improved construction and effectively and efficiently fulfills its intended function.

Other objects of the invention and the various advantages and characteristics of the present machine will be apparent from a consideration of the following detailed description.

The invention consists in the several novel features which are hereinafter set forth and are more particularly defined by claims at the conclusion hereof.

In the drawings which accompany and form a part of this specification or disclosure and in which like letters and numerals of reference denote corresponding parts throughout the several views:

Figure 1 is a fragmentary front elevation of a combined measuring and filling machine embodying the invention;

Figure 2 is an enlarged end view;

Figure 3 is a plan view showing the levers constituting the container arresting or stopping means in the position they assume when one of the nozzles is operating to fill the subjacent container with a measured charge of liquid material;

Figure 4 is a plan view showing such levers in the position they assume when the other nozzle is operating to fill the subjacent container with a measured charge of material;

Figure 5 is an enlarged vertical transverse section on the line 5—5 of Figure 1;

Figures 6, 7:
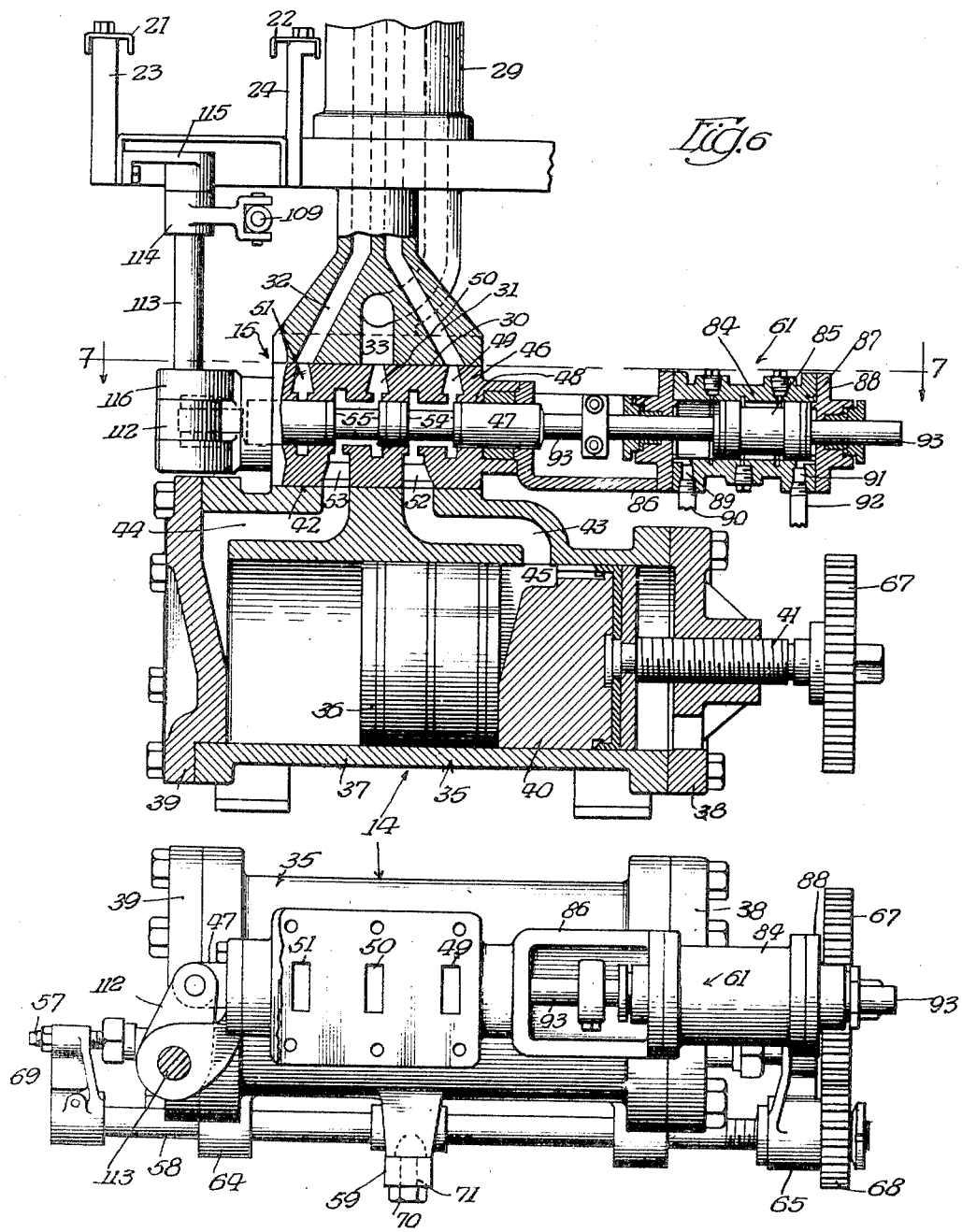
Figure 6 is an enlarged vertical transverse section taken on the line 6—6 of Figure 1 and illustrating in detail the construction and design of the cylinder-floating piston device and the two-position valve mechanism for controlling such device.
Figure 7 is a horizontal section on the line 7—7 of Figure 6.

The machine which is shown in the drawings constitutes the preferred form or embodiment of the invention. It serves as a medium for automatically filling containers with measured charges or quantities of liquid material, such as congealable lard or vegetable oil shortening, and comprises an elongated supporting structure 10, an endless power driven belt 11 for feeding containers to be filled, a pair of laterally spaced depending nozzles 12 and 13, a cylinder-floating piston device 14 for alternately delivering to the nozzles measured charges of liquid material, a unitary two-position valve mechanism 15 for controlling the cylinder-floating piston device 14, mechanism for shifting the valve mechanism 15 at the end of each stroke of the floating piston of the device 14, and means for controlling feed of the containers by the endless belt so that there is an empty container under each nozzle in connection with discharge therefrom of a measured charge of liquid material.

The supporting structure 10 is in the form of a frame and embodies at the top thereof a narrow, horizontally extending, flat platform 16. This platform is formed of sheet or plate metal and, as shown in Figure 5, has a depending flange 17 along the front margin thereof and a depending flange 18 along its rear margin. In addition to the platform 16 the supporting structure 10 comprises a plurality of vertically extending angle bar type legs 19 for supporting the platform in an elevated position over the floor of the establishment in which the machine is used, and a plurality of longitudinally extending angle type braces 20 between the legs 19. The platform 16 serves to support the container feeding reach of the endless belt 11 for longitudinal travel therealong and has associated therewith a front rail 21 and a rear rail 22. These two rails are disposed in parallel and laterally spaced relation and serve to prevent or limit sidewise displacement of the containers during travel on the container feeding reach of the belt 11. The front rail 21 overlies the front margin of the platform 16 and is in the form of a channel bar. It is horizontally aligned with the rear rail 22 and is supported by way of a longitudinal series of laterally spaced posts 23. The lower ends of these posts are secured to the flange 17 along the front margin of the platform 16 and the upper ends of the posts are connected to the web portion of the front rail 21. The rear rail 22 is formed of a channel bar and is supported by way of a longitudinal series of vertically extending posts 24, the lower ends of which are attached to the depending flange 18 along the rear margin of the platform 16 and the upper ends of which underlie and are fixedly connected to the web portion of the rear rail 22.

The endless belt 11 is continuously driven at a constant speed by way of a pulley and an electric motor (not shown). It comprises an upper container feeding reach 25 and this rests upon, and extends lengthwise of, the platform 16 at the top of the supporting structure 10. The right hand end of the belt reach 25, as viewed in Figures 1, 3 and 4, constitutes the receiving end and is adapted to receive the containers in series form. The left hand end of the belt reach 25 serves as the discharge end and passes around a freely rotatable pulley 26 at the upper left corner of the supporting structure 10. From the pulley 26 the belt 11 extends diagonally downwards and inwards, then passes around an idler pulley 27, then passes forwards and upwards, then passes around a take-up pulley 27a, then extends horizontally from the take-up pulley, and then passes around other pulleys (not shown). The lower horizontal portion of the belt, that is, the portion extending from the take-up pulley 27a, constitutes the return reach of the belt. The containers, after being filled by the nozzles 12 and 13, are discharged from the belt reach 25 as the latter passes around the pulley 26. Such pulley and the pulleys 17 and 27a are suitably supported by the supporting structure 10, as shown in Figure 1.

The nozzles 12 and 13 overhang the reach 25 of the belt 11 and are carried at the ends of a horizontally extending member 28 which is positioned above and behind the belt 11 and extends in parallel relation with the platform 16. The nozzle carrying member 28 is supported by way of a vertically extending member 29 which is suitably mounted on the supporting structure 10. The upper end of the member 29 is connected to the central portion of the horizontally extending member 28 and the lower end of said member 29 projects beneath the upper reach of the belt and has a flat horizontal bottom face 30. A duct 31 is formed in the members 29 and 28 and this duct leads from the face 30 to the nozzle 12. A second duct 32 is formed in said members 29 and 28 and this duct leads from the flat face 30 at the lower end of the member 29 to the nozzle 13. A vertically extending passage 33 is formed in the member 29. The upper end of this passage is connected by a pipe 34 to receive the liquid material under pressure from any suitable source. The lower end of the passage 33 leads to and through the flat face 30 and is disposed between the lower ends of the ducts 31 and 32. The nozzle 12 overlies the receiving end of the upper reach of the belt 11 and the nozzle 13 is located three carton lengths to the left of the nozzle 12, as viewed and shown in Figures 1, 3 and 4.

Figure 8:
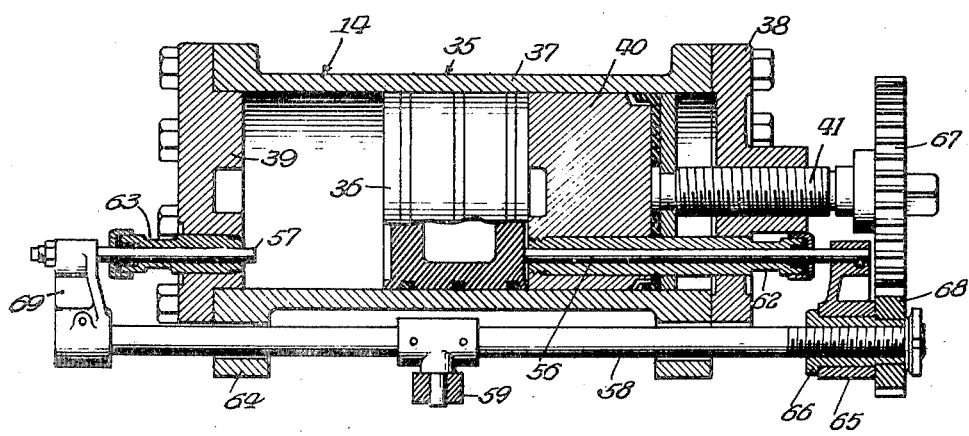
Figure 8 is a horizontal section on the line 8—8 of Figure 2.

The device 14 comprises a cylinder 35 and a floating piston 36. The cylinder 35 is supported on the supporting structure 10 beneath the vertically extending member 29. It is disposed in a horizontal position and comprises a substantially cylindrical side wall 37 and a pair of fixed circular heads 38 and 39. The head 38 is bolted or otherwise fixedly secured to the right hand end of the cylindrical side wall 37, as viewed in Figures 6 and 8, and the head 39 is suitably attached to the left hand end of the cylinder side wall 37 and serves as a closure therefor. In addition to the side wall and fixed heads the cylinder 35 comprises a false head 40 and this is slidably mounted in the end of the cylinder to which the head 38 is applied. By sliding the false head 40 to and from the head 38 the volume of the space between the false head and the head 39 may be varied and the amounts of the charges of material thus regulated. Sliding movement of the false head 40 to and from the head 38 is effected by means of a screw 41 which extends through a threaded hole in the central portion of the head 38. The upper portion of the side wall 37 of the cylinder 35 is provided with a flat horizontal face 42 and embodies a pair of ports 43 and 44. The port 43 is so arranged that one end thereof leads to and through the face 42 and its other end communicates with the interior of the cylinder at a point slightly inwards of the fixed head 38 (see Figure 6). The other port is so arranged that one end thereof leads to and through the face 42 and its other end communicates with the interior of the cylinder at a point directly adjacent the fixed head 39. The false head 40 is provided in the upper portion thereof with an angular notch 45 and this serves to maintain at all times communication of the port 43 with the cylinder interior, regardless of the position of the false head. The floating piston 36 is slidably mounted in the side wall 37 of the cylinder 35 and is adapted, as hereinafter described, to slide back and forth in the cylinder between the fixed head 39 and the false head 40. When the floating piston slides to the left, as viewed in Figure 6, the liquid material between it and the fixed head 39 is caused to flow through the port 44 and the duct 32 to and through the nozzle 13. Reverse sliding movement on the part of the piston results in the liquid material between it and the false head 40 being forced through the port 43 and the duct 31 to and through the nozzle 12.

The valve mechanism 15 is interposed between the flat face 30 at the lower end of the member 29 and the flat face 42 on the upper portion of the side wall 37 of the cylinder 35. It serves as an automatic controlling medium whereby the charges of the liquid material under pressure are caused alternately to flow through the nozzles 12 and 13. As its main or principal parts the mechanism 15 comprises a housing 46 and a spool type valve 47. The housing has a flat upper face in engagement with the flat face 30 at the lower end of the member 29 and a flat lower face in engagement with the flat face 42 on the upper portion of the cylinder side wall 37. In addition, the housing has a horizontal bore 48 in parallel relation with the cylinder 35, three laterally spaced upper ports 49, 50 and 51 and two laterally spaced lower ports 52 and 53. The upper ports lead from, and communicate with, the upper portion of the bore 48 and the lower ports are in communication with, and lead from, the lower portion of the bore. The port 49 registers with the lower end of the duct 31, the port 50 registers and communicates with the lower end of the passage 33, and the port 51 is in registry with the lower end of the duct 32. As shown in Figure 6, the port 50 is disposed midway between the ports 49 and 51. The lower port 52 registers with the upper end of the port 43 in the upper portion of the cylinder side wall 37 and is located at a point substantially midway between the upper ports 49 and 50. The lower port 53 registers and communicates with the upper end of the cylinder port 44 and is so positioned that it is disposed midway between the upper ports 50 and 51. The spool type valve 47 of the valve mechanism 14 is slidably mounted in the bore 48 and has in the central portion thereof a pair of annular, laterally spaced grooves 54 and 55. The valve 47 is shiftable back and forth between two positions. When the valve is shifted to the right, as viewed and shown in Figure 6, the groove 54 registers with the ports 49 and 52 and establishes communication therebetween, the groove 55 registers with the ports 50 and 51 and establishes communication therebetween, and the portion of the valve outwards of the groove 55 closes the port 51. When the valve is in its right hand position the liquid material under pressure flows through the passage 33, the port 50, the groove 55, the port 53 and the port 44 and thence into the left hand end of the cylinder, that is, the space between the fixed head 39 and the floating piston 36. By reason of the fact that the material is under pressure the portion of the material entering such space forces the floating piston 36 to slide towards the false head 40. As the floating piston moves towards the false head 40 the material between the floating piston and the false head is caused to flow through the port 43, the port 52, the groove 54, the port 49 and the duct 31 to and through the nozzle 12. When the valve 47 is shifted to the left the portion thereof that is outwards of the groove 54 closes the port 49, the groove 54 establishes communication between the ports 50 and 52, and the groove 55 establishes communication between the ports 51 and 53. While the valve 47 is shifted to the left the liquid material flows through the passage 33, the port 50, the groove 54, and the ports 52 and 43 into the right hand end of the cylinder, that is, the space between the false head 40 and the floating piston 36. As the material enters such space it forces the floating piston 36 towards the fixed head 39. As the piston slides or travels to the left in response to inflow of the material between it and the false head the material in the left hand end of the cylinder is forced through the ports 44 and 53, the groove 55, the port 51 and the duct 32, and thence to and through the nozzle 13. During each stroke of the piston a measured quantity of the liquid material is forced through one of the nozzles. During shift of the piston to the right a measured quantity of the material is discharged from the nozzle 12 and during reverse shift of the piston, that is, shift to the left, a measured quantity of the material is discharged from the nozzle 13. The charges from the two nozzles are precisely equal. By adjusting the false head 40 toward the fixed head 38 the amount of each charge will be increased. Adjustment of the false head away from the fixed head 38 results in a reduction in the amount or volume of each charge. The spool type valve 47 of the unitary two-position valve mechanism 14 is shifted automatically at the end of each stroke of the floating piston 36 and hence there is a continuous intermittent discharge of the charges of the material from each nozzle.

The mechanism for automatically shifting the spool type valve 47 of the valve mechanism 14 at the end of each stroke of the floating piston in the cylinder 35 comprises a pair of axially aligned push rods 56 and 57, a tie rod 58 between the two push rods, a lever 59, a D-valve 60, and a cylinder-piston device 61. The push rod 56 is slidably mounted in a sleeve 62 at the right hand end of the cylinder 35. The inner end of the sleeve extends through and is fixedly secured in the false head 40. The outer end of the sleeve 62 extends loosely through a hole in the fixed head 38 of the cylinder 35 in order that when the false head 40 is adjusted longitudinally of the cylinder the outer end of the sleeve 62 slides relatively to the fixed head 38. The inner end of the push rod 56 projects a small distance inwards of the inner face of the false head 40 with the result that the floating piston 36 abuts against it as it reaches the end of right hand sliding movement and shifts the push rod 56 to the right. The push rod 57 extends longitudinally of the cylinder 11 and is slidably mounted in a sleeve 63 which is fixedly mounted in the head 39 and is axially aligned with the sleeve 62 for the push rod 43. The inner end of the push rod 57 projects a small distance inwards of the fixed head 39 of the cylinder 35 and hence when the floating piston reaches the end of its stroke in connection with left hand sliding movement it abuts against the push rod 57 and shifts the latter to the left, as viewed in Figure 8. The outer end of the push rod 57 projects beyond the outer end of the sleeve 63. The tie rod 58 is located exteriorly of the cylinder 35 and is positioned in parallel relation with the cylinder side wall 37. It serves to connect the two push rods for conjoint sliding movement and is mounted for axial sliding movement in a pair of apertured lugs 64 on the ends of the cylinder side wall 37. The right hand end of the tie rod is connected to the outer end of the push rod 56 by way of an arm 65 and an axially adjustable sleeve 66 on the slide rod. A gear 67 on the outer end of the adjusting screw 41 and a pinion 68 on the sleeve 66 serve to connect the false head 40 and the push rod 56 for conjoint adjustment while at the same time they permit the push rod 56 to slide to a limited extent relatively to the false head. The left hand end of the tie rod 58 is connected to the outer end of the push rod 57 by way of an arm 69. By reason of the fact that the push rods 56 and 57 are connected together by the tie rod 58 they are caused conjointly to move to the right when the floating piston 36 reaches the end of right hand sliding movement and they are also caused conjointly to shift to the left when the piston approaches the end of its stroke in connection with sliding to the left.

The lever 59 extends vertically and is disposed outwards of the central portion of the tie rod 58. It serves as a medium for controlling the D-valve 60 in response to shift of said tie rod. The upper end of the lever 59 is pivotally supported by way of a pivot stud 70 and this, as shown in Figure 2, is secured to, and projects laterally from, the central portion of the side wall 37 of the cylinder 35. The central portion of the lever 59 is operatively connected to the central portion of the tie rod 58 by way of a pin 71. One end of this pin is fixedly connected to a collar on the central portion of the tie rod 58 and the other end of the pin fits within a vertically extending slot in the central portion of the lever 59. When the tie rod 58 is shifted to the right the lever 59 is caused to swing to the right. Reverse shift on the part of the tie rod results in the lever 59 swinging to the left.

The D-valve 60 constitutes a medium for controlling the cylinder-piston device 61. It is mounted on a bracket 72 on the right hand end of the cylinder side wall 37 and comprises a horizontally elongated housing 73 and a slide valve 74 in the housing. The housing has a chamber 75 for the slide valve 74 and embodies a port 76 in the upper portion thereof and three laterally spaced ports 77, 78 and 79 in its bottom portion. The port 76 leads to the chamber 75 and is connected to a source of air under pressure by way of a vertically extending pipe 80. The port 78 is disposed between the ports 77 and 79 and is in the nature of an exhaust port in that it leads to the atmosphere surrounding the D-valve 60. The port 77 communicates with the left hand side of the chamber 75, as viewed in Figure 9, and the port 79 communicates with the right hand end of the chamber 75. The slide valve 74 is mounted on a horizontally extending slide rod 81 and is adapted to slide or move back and forth in the chamber 75 in response to sliding movement of the slide rod. One end of the slide rod projects through the housing 73 of the D-valve 60 and is connected by a link 82 to the lower end of the lever 59. The bottom portion of the slide valve 74 engages slidably the bottom wall of the housing 73 and has a downwardly facing cavity 83. When the lever 59 is swung to the right, as viewed in Figure 2, the slide valve 74 is caused to slide to the right, as viewed in Figure 9. When the slide valve 74 is slid to the right the port 77 is uncovered and receives air under pressure from the port 76 via the chamber 75 and the port 79 is covered by the slide valve and is in communication with the exhaust port 78 by way of the cavity 83 in the slide valve. When the slide valve 74 is slid to the left hand end of the chamber 75 in connection with left hand shift of the tie rod 58 the port 79 is exposed and receives air under pressure from the port 76 via the chamber 75, and the port 77 is covered by the slide valve and communicates with the exhaust port 78 by way of the cavity 83.

Figure 9:
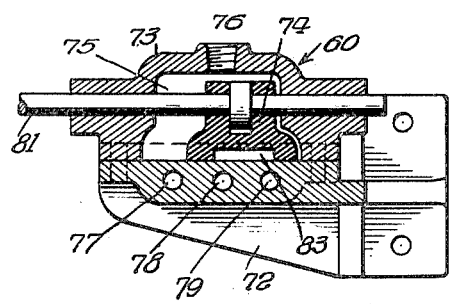
Figure 9 is a section of the D-valve forming a part of the mechanism for automatically shifting the two-position valve mechanism at the end of each stroke of the floating piston of the cylinder-floating piston device.

The cylinder and piston device 61 operates to shift the spool type valve 47 of the valve mechanism 14 under control of the D-valve 60. It is located above the cylinder 35 and in alignment with the right hand end of the housing 46 of the valve mechanism 14, and comprises a horizontal cylinder 84 and a piston 85. The cylinder 84 is supported in axial alignment with the spool type valve 47 of the mechanism 15 by way of a bracket 86. It consists of a cylindrical side wall 87 and a pair of fixed heads 88 at the ends of the side wall. A port 89 communicates with the left hand end of the cylinder interior and this port is connected to the port 79 of the D-valve 60 by way of a pipe 90. A port 91 communicates with the right hand end of the interior of the cylinder 84 and this port is connected to the port 77 of the housing 73 of the D-valve by way of a pipe 92. The piston 85 of the device 61 is mounted to slide back and forth between the ends of the cylinder 84 and has the left hand end thereof connected to the right hand end of the spool type valve 47 of the valve mechanism 15 by way of a horizontally extending rod 93. When the slide valve 74 of the D-valve is shifted to the right, air under pressure flows into the right hand end of the cylinder 84 via the port 77, the pipe 92 and the port 91 and causes the piston 85 to slide to the left hand end of the cylinder 84. Such sliding movement on the part of the piston 85 serves to shift the spool type valve 49 to the left. When the slide valve 74 of the D-valve is shifted to the right, as shown in Figure 9, the left hand end of the cylinder 84 of the cylinder-piston device 61 is vented by way of the port 89, the pipe 90, the port 79, the cavity 83 and the exhaust port 78. When the slide valve 74 of the D-valve is shifted to the left as the result of the floating piston 36 being shifted against the push rod 57 air under pressure is admitted into the left hand end of the cylinder 84 by way of the chamber 75 in the D-valve housing 73, the port 79, the pipe 90 and the port 89. When the sliding valve 74 is shifted to the left the right hand end of the cylinder 84 is vented by way of the port 91, the pipe 92, the port 77, the cavity 83 and the exhaust port 78.

The operation of the cylinder-floating piston device 14, the valve mechanism 15, and the mechanism for automatically shifting the valve mechanism at the end of each stroke of the floating piston is as follows:

When the spool type valve 47 is shifted to the right the liquid material under pressure flows through the passage 33, the port 50, the groove 55, and the ports 53 and 44 into the left hand end of the cylinder 35. As the material enters the left hand end of the cylinder it forces the floating piston 36 to slide to the right. Such sliding movement on the part of the floating piston results in the material between it and the false head 40 being forced through the ports 43 and 52, the groove 54, the port 49, and the duct 31 to the nozzle 12, as hereinbefore described. When the floating piston 36 reaches the false head 40 it engages the inner end of the push rod 56 and slides the push rod to the right. This results in the tie rod 58 being shifted to the right and causes the tie rod to swing the lever 59 to the right. Such swinging on the part of the lever causes the slide valve 74 of the D-valve 60 to slide to the right, as viewed in Figure 9. As soon as the slide valve is shifted to the right air under pressure flows through the port 77 from the chamber 75, and thence passes through the pipe 92 to the port 91 and into the right hand end of the cylinder 84 of the cylinder-piston device 61. As soon as air under pressure enters the right hand end of the cylinder 84 it slides the piston 85 to the left and causes the spool type valve 47 of the mechanism 14 to slide to the left. As soon as the spool type valve 47 is slid to the left it closes the port 49 and establishes communication between the ports 50 and 52, and also establishes communication between the ports 51 and 53. When the ports 50 and 52 are in communication with one another the liquid material under pressure flows into the right hand end of the cylinder 35 via the port 43 and causes the floating piston 36 to slide to the left, that is, towards the fixed head 39. During travel of the floating piston 36 to the left the material between it and the fixed head 39 flows through the ports 44 and 53, the groove 55, the port 51 and the duct 32 to and through the nozzle 13. As soon as the floating piston 36 approaches the fixed head 39 it comes in contact with the inner end of the push rod 57 and causes such push rod, together with the tie rod 58 and the push rod 56, to slide to the left. Such sliding movement results in the lever 59 swinging to the left and causing the slide valve 74 of the D-valve 60 to slide to the left hand end of the chamber 75 in the housing 73. When the slide valve 74 is shifted to the left hand end of the chamber 75 air under pressure flows from the chamber 75 through the port 79, the pipe 90, and the port 89 into the left hand end of the cylinder 84. As the air flows into the left hand end of the cylinder 84 it forces the piston 85 to the right and this in turn causes the spool type valve 47 of the valve mechanism 15 to slide to the right. Thereafter the same cycle of controlled movements or operations takes place.

The means for controlling feed of the containers by the endless belt so that there is an empty container under each nozzle in connection with discharge therefrom of a measured charge of liquid material, comprises a pair of levers 95 and 96. As hereinafter described, these levers coact in such manner that every other container is arrested or brought to rest under the nozzle 12 and the alternate containers on the reach 25 of the belt 11 are arrested or brought to rest under the nozzle 13. The lever 95 extends horizontally and is positioned in front of the nozzle 12 and between the front rail 21 and the front margin of the platform 16. It extends lengthwise of the platform and embodies at its right hand end, as viewed in Figures 1, 3 and 4, a depending pivot or fulcrum pin 97. The upper end of this pin is fixed within a socket in a hub 98 at the right hand end of the lever 95 and the central portion of the pin is journalled in a bearing 99 on the flange 17 along the front margin of the platform 16. The pivot pin and bearing permit the lever 95 to swing to and from the nozzle 12, as shown in Figures 3 and 4. The distal or left hand end of the lever 95 embodies an inwardly or rearwardly extending stop finger 100 and this fits within a cutout 101 in the front rail 21 and is located substantially half a container's length to the left of the nozzle 12. When the lever 95 is swung inwards, that is, in a clockwise direction as viewed in Figures 3 and 4, the stop finger 100 moves inwards into overlying relation with the container feeding reach 25 of the belt and serves to arrest the next container together with the following containers (see Figure 4). When the lever 95 is swung outwards, that is, in a counter-clockwise direction, the stop finger 100 moves into an inoperative position and releases the arrested container beneath the nozzle 12 and permits such container and the following containers to be carried by the belt reach 25 toward the nozzle 13. As hereinafter described, the lever 95 is swung inwards for container arresting purposes conjointly with shift of the spool type valve 47 of the valve mechanism 15 to the right wherein it establishes communication between the cylinder port 43 and the duct 31 and permits a charge of liquid material under pressure to flow through the nozzle 12. Thus, an empty container on the belt reach 25 is arrested under the nozzle 12 directly prior to discharge of a measured quantity of liquid material therefrom and filling of the container under the nozzle 12 takes place. As hereinafter described, the lever 95 is swung outwards, that is, in a counter-clockwise direction, conjointly with shift of the spool type valve 47 to the left, thus releasing the filled container for further travel on the belt reach 25 as soon as flow of the liquid material from the nozzle 12 ceases. The lever 96 is located to the left of the nozzle 13. It is positioned midway between the front rail 21 along the front margin of the platform 16. It extends lengthwise of the platform and embodies at the central portion thereof a depending pivot or fulcrum pin 102. The upper end of this pin is fixed within a socket in a hub 103 at the midpoint of the central portion of the lever 96. The central portion of the pin 102 is journalled in a bearing 104 on the depending flange 17 along the front margin of the platform 16. The right hand end of the lever 96, as viewed in Figures 3 and 4, is provided with an inwardly or rearwardly extending stop finger 105 and this is positioned a half container's length to the left of the nozzle 13 and fits within a cutout 106 in the front rail 21. The left hand end of the lever 96, as viewed in Figures 3 and 4, is provided with an inwardly or rearwardly extending stop finger 107 and this is positioned two container lengths from the stop finger 105 and fits within a cutout 108 in said front rail 21. When the lever 96 is swung in a counterclockwise direction, as viewed in Figures 3 and 4, the stop finger 105 moves inwards into a position wherein it serves to arrest the preceding container on the belt reach 25 and the stop finger 107 swings or moves outwards into an inoperative position wherein the containers on the belt reach between it and the stop finger 105 are released for further travel with said belt reach 25 (see Figure 3). When the lever 96 is swung in a clockwise direction, as viewed in Figures 3 and 4, the stop finger 107 is moved into a container arresting position and the stop finger 105 is moved into a container releasing position (see Figure 4). As hereinafter described, the lever 96 is caused to swing in a clockwise direction conjointly with the lever 95 and simultaneously with shift of the spool type valve 47 to the right and is caused to swing in a counterclockwise direction conjointly with the lever 95 when the spool type valve 47 of the valve mechanism 15 is shifted to the left to effect discharge of a measured charge of liquid material from the nozzle 13. The levers 95 and 96 are connected for conjoint clockwise and counterclockwise swinging movement by way of a tie rod 109 and a pair of arms 110 and 111.

The tie rod underlies, and is disposed in parallel relation with, the rear margin of the platform 16. The arm 110 is associated with the right hand end of the tie rod and one end thereof is keyed or otherwise fixedly secured to the lower end of the pivot pin 98 and its other end is pivotally connected to said right hand end of the tie rod. The arm 111 is associated with the left hand end of the tie rod. One end of this arm is fixed to the lower end of the pivot pin 102 and the other end is pivotally connected to said left hand end of the tie rod 109. When the tie rod is shifted to the right, as viewed in Figures 1, 3 and 4, the arms 110 and 111 operate conjointly to swing the levers 95 and 96 in a clockwise direction. Left hand shift of the tie rod 109 results in conjoint counterclockwise swinging of the levers 95 and 96. A connection in the form of an arm 112, a rock shaft 113 and an arm 114 serves to connect the tie rod to the spool type valve 47 of the valve mechanism 15 so that it is shifted to the right in response to right hand shift of the spool type valve 47, as viewed in Figure 6, and is shifted to the left in connection with left hand shift of the spool type valve 47. The rock shaft 113 extends vertically and has the upper end thereof journalled in a bearing 115 on the depending flange 17 of the platform 16. The lower end of the rock shaft is journalled in a pair of vertically placed bearings 116 on the housing 46 of the valve mechanism 15. One end of the arm 112 is pivotally connected to the left hand end of the spool type valve 47 and the other end of said arm 112 is disposed between the bearings 116 and is fixed to the lower end of the rock shaft 113. The arm 114 is located beneath the bearing 115. One end of the arm 114 is fixed to the upper end of the rock shaft 113 and the other end of such arm 114 is pivotally connected to the central portion of the tie rod 109. When the spool type valve 47 is shifted to the right preliminary to discharge of a measured charge of liquid material from the nozzle 12 the tie rod 109, due to its connection with said spool type valve 47, is shifted to the right, as viewed in Figures 1, 3 and 4, and causes the levers 95 and 96 to swing in a clockwise direction. When the spool type valve 47 of the valve mechanism 15 is shifted to the left preliminary to discharge of a measured charge of liquid material from the nozzle 13 the tie rod 109 is shifted to the left and operates, through the medium of the arms 110 and 111, conjointly to swing the levers 95 and 96 in a counterclockwise direction. Figure 3 of the drawing shows the tie rod shifted to the left in response to left hand shift of the spool type valve 47 and Figure 4 shows the tie rod shifted to the right as the result of right hand shift of said spool type valve 47. For convenience in understanding the operation of the levers 95 and 96, five containers are shown on the belt reach 25 and these, reading from left to right in Figure 3, are designated by the reference letters $c^1$, $c^2$, $c^3$, $c^4$ and $c^5$. The container $c^1$ is shown as being directly under, and being filled by, the nozzle 13. It is also shown as being arrested by the stop finger 105 as the result of the lever 96 being swung in a counterclockwise direction. The container $c^2$ is illustrated as having been filled by the nozzle 12 and next follows the arrested container $c^1$. It is held in a stationary position by the container $c^1$ although the belt 11 is constantly driven. The container $c^3$ follows the container $c^2$ and is an empty container. It abuts against the container $c^2$ and is stationary as the result of the container $c^1$ being arrested by the stop finger 105. The container $c^4$ is an empty container underlying the nozzle 12. It is stationary as the result of the container $c^1$ being arrested although it is not arrested by the stop finger 100 because of the lever 95 being swung counterclockwise. The container $c^5$ is empty and follows the container $c^4$. When the containers are positioned as shown in Figure 3 the spool type valve 47, as previously pointed out, is in its left hand position and a measured charge of liquid material is discharged through the nozzle 13 into the subjacent container $c^1$. As soon as a measured charge of liquid material is discharged from the nozzle 13 into the subjacent container $c^1$ the spool type valve 47 is shifted to the right, as viewed in Figure 6 and hereinbefore described. Conjointly with shift of the spool type valve 47 to the right the tie rod 109 is shifted to the right and results in clockwise swinging of the levers 95 and 96. Clockwise swinging of the lever 95 brings the stop finger 100 into the position shown in Figure 4 wherein it arrests the container $c^4$ and holds the same under the nozzle 12 and in a position to receive a measured charge of liquid material from such nozzle. Because of arresting of the container $c^4$ under the nozzle 12 during filling thereof the following container $c^5$ is also arrested. As soon as the lever 96 swings in a clockwise direction conjointly with the lever 95 the stop finger 105 swings out of arresting relation with the filled container $c^1$ and the finger 107 swings into its container arresting position. As soon as the stop finger 105 swings away from the container $c^1$ the containers $c^1$, $c^2$ and $c^3$ are advanced two container lengths by the belt reach 25, that is, such containers are advanced until the container $c^1$ strikes against the stop finger 107. When the filled container $c^1$ is arrested by the stop finger 107 the empty container $c^3$ is positioned under the nozzle 13 in readiness to receive a measured charge of liquid material therefrom. The containers $c^1$, $c^2$ and $c^3$ remain in the position shown in Figure 4 during filling of the container $c^4$ by the nozzle 12. As soon as a measured charge of liquid material is discharged from the nozzle 12 into the subjacent container $c^4$ the spool type valve 47 is shifted to the left and causes the tie rod 109 again to shift to the left and swing the levers 95 and 96 in a counterclockwise direction. Counterclockwise swinging of the lever 96 results in the stop finger 105 arresting the empty container $c^3$ under the nozzle 13 for filling thereby and also results in the stop finger 107 releasing the filled containers $c^1$ and $c^2$ so that they travel to the discharge end of the belt reach 25. Counterclockwise swinging of the lever 95 in connection with left hand shift of the tie rod 109 releases the filled container $c^4$ so that it, together with the empty container $c^5$ and the next following empty container, moves along the platform until they are arrested by the container $c^3$, that is, the container that is now being filled by the nozzle 13. As the result of the action of the levers 95 and 96 every other container is brought to rest under the nozzle 13 for filling purposes and the alternate containers are brought to rest under the nozzle 12 for filling purposes. As shown in Figures 3 and 4, the rear rail 22 is provided with a wedge shaped cutout 117 in alignment with the cutout 101 in the front rail 21, and a second wedge shaped cutout 118. The latter cutout is aligned with the front rail cutout 106 for accommodating the stop finger 105. Referring to Figure 3, the cutout 117 serves to receive the empty container $c^3$ when the latter is laterally deflected momentarily as the result of the stop finger 100 swinging inwards into arresting relation with the unfilled or empty container $c^4$. Referring to Figure 4, the cutout 118 serves to receive the filled container $c^2$ when it is laterally deflected momentarily in connection with inward swinging of the stop finger 105 into arresting relation with the empty container $c^3$. When the containers are arrested by the stop fingers the belt reach 25 slides under them. When the containers are released they move with the belt reach 25 because of frictional engagement therewith.

The herein described combined measuring and filling machine is essentially simple in construction and is wholly automatic. It is both efficient and positive in operation and effectively accomplishes its intended purpose or function.

Whereas the machine has been described as being primarily for use in filling containers with measured charges of liquid lard or vegetable oil shortening it is to be understood that it may be used in connection with the dispensing of other liquids or so-called semi-liquids.

This application is a continuation of our co-pending application Serial No. 471,860, filed January 9, 1943, for Combined measuring and filling machine, which has become abandoned.

It is understood that the invention is not to be restricted to the details set forth since these may be modified within the scope of the appended claims without departing from the spirit and scope of the invention.

We claim:

1. A machine of the character described comprising in combination a pair of laterally spaced nozzles, means for delivering measured charges of liquid material alternately to the nozzles for discharge therefrom, including a two-position spool valve, a belt type conveyor adapted to have a single line series of containers to be filled mounted longitudinally and loosely thereon, having means associated therewith for driving it constantly during operation of the machine and adapted when driven to feed the containers successively past the two nozzles, automatic means operative successively to cause every other container on the conveyor to be arrested adjacent one only of the nozzles during discharge of a measured charge of liquid material therefrom, and including a member disposed adjacent the conveyor and said one nozzle provided with a container engaging stop finger, mounted to move into and out of an operative position wherein its finger is disposed for container arresting purposes and connected to the valve so as to be shifted in response to shift of said valve, and automatic means operative successively to cause each alternate container on the conveyor to be arrested adjacent only the other nozzle during discharge of a measured charge of liquid material therefrom, including a member disposed adjacent said conveyor and said other nozzle, provided with a container engaging finger, mounted to move into and out of an operative position wherein its finger is disposed for container arresting purposes, connected to the valve so as to be shifted in response to shift of said valve, and arranged and controlled so that it is shifted or moved into its operative position in alternate relation with the first mentioned member.

2. A machine comprising a continuous conveyor adapted to have a single line series of containers carried longitudinally and loosely thereon, means for driving said conveyor, a pair of nozzles spaced from each other by three container lengths, means for delivering measured charges of material alternately to the nozzles for discharge therefrom, including a valve, automatic means operative successively to cause every other container on the conveyor to be arrested adjacent one only of the nozzles during discharge of a measured charge of material therefrom, and including a member disposed adjacent the conveyor and said nozzle provided with a container engaging stop finger, mounted to move into and out of an operative position wherein its finger is disposed for container arresting purposes and connected to said valve so as to be shifted in response to shift of said valve, and automatic means operative successively to cause each alternate container on the conveyor to be arrested adjacent only the other nozzle during discharge of a measured charge of material therefrom, including a member disposed adjacent said conveyor and said other nozzle, provided with a container engaging finger, mounted to move into and out of an operative position wherein its finger is disposed for container arresting purposes, connected to the valve so as to be shifted in response to shift of said valve, and arranged and controlled so that it is shifted into its operative position in alternate relation with the first mentioned member.

3. A machine comprising a continuous conveyor adapted to carry a line series of containers mounted longitudinally and loosely thereon, a pair of nozzles spaced three container lengths apart, means for delivering measured charges of material alternately to the nozzles for discharge therefrom, including a control valve, means for driving said conveyor constantly during operation of the machine, automatic means operative successively to cause every other container on the conveyor to be arrested adjacent one of the nozzles during discharge of a measured charge of material therefrom and then released after filling for movement with the conveyor, and automatic means arranged to cause each alternate container to be arrested adjacent the other nozzle during discharge of a measured charge of liquid therefrom and then released after filling for continued movement with said conveyor.

4. A machine comprising a continuous conveyor adapted to carry a line series of containers mounted longitudinally and loosely thereon, a pair of nozzles spaced three container lengths apart, means for delivering measured charges of material alternately to the nozzles for discharge therefrom, including a control valve, means for driving said conveyor constantly during operation of the machine, automatic means operative successively to cause every other container on the conveyor to be arrested adjacent one of the nozzles during discharge of a measured charge of material therefrom and then released after filling for movement with the conveyor, automatic means arranged to cause each alternate container to be arrested adjacent the other nozzle during discharge of a measured charge of liquid therefrom and then released after filling for continued movement with said conveyor, and connections between said arresting means and said valve for bringing about the discharge of material from a nozzle only when a container is arrested thereunder.

5. In a filling machine, a belt type conveyor adapted to have a single line series of containers to be filled mounted longitudinally and loosely thereon, a pair of nozzles spaced three container lengths apart, means for delivering measured charges of liquid material alternately to the nozzles for discharge therefrom, including a two-position valve, a movably mounted stop finger, means for moving the finger into position across said belt for arresting every other container adjacent one only of the nozzles during discharge of a measured charge of material therefrom, a movably mounted stop finger adapted to be moved across the conveyor to arrest each alternate container on the conveyor adjacent only the other nozzle during discharge of a measured charge of material therefrom, and means connecting said finger-actuated means and said valve to bring about the discharge of material from a nozzle only when a container is arrested in position there-below.

6. In a filling machine, a belt type conveyor adapted to receive a line of containers to be filled mounted longitudinally and loosely thereon, means for driving said conveyor constantly during operation of the machine, a pair of nozzles spaced three container lengths apart, means for delivering measured charges of material alternately to the nozzles for discharge therefrom, including a valve, a movably mounted stop member movable into a position over the conveyor to arrest every other container on the conveyor adjacent one only of the nozzles during discharge of a measured charge of liquid material therefrom, another stop member movably mounted into a position over the conveyor for arresting each alternate container on the conveyor adjacent only the other nozzle during discharge of a measured charge of liquid material therefrom, and connecting members between said valve and said stop members for actuating said valve for the discharge of material from a nozzle only when a container is arrested there-below.

7. In a filling machine, a belt type conveyor adapted to receive a series of containers in longitudinal arrangement thereon, a pair of nozzles spaced apart three container lengths, means for delivering measured charges of material alternately to the nozzles for discharge therefrom, including a valve, automatic means operative successively to cause every other container on the conveyor to be arrested adjacent one only of the nozzles during discharge of a measured charge of liquid material therefrom, automatic means operative successively to cause each alternate container on the conveyor to be arrested adjacent only the other nozzle during discharge of a measured charge of liquid material therefrom, and connecting members between said automatic means and said valve for synchronizing the operation of the valve with the operation of the arresting means.

CARL G. MEYERS.
BERTIE S. HARRINGTON.

REFERENCES CITED

The following references are of record in the file of this patent:

UNITED STATES PATENTS

| Number | Name | Date |
|---|---|---|
| 1,700,494 | Harrington | Jan. 29, 1929 |